Figure 1:
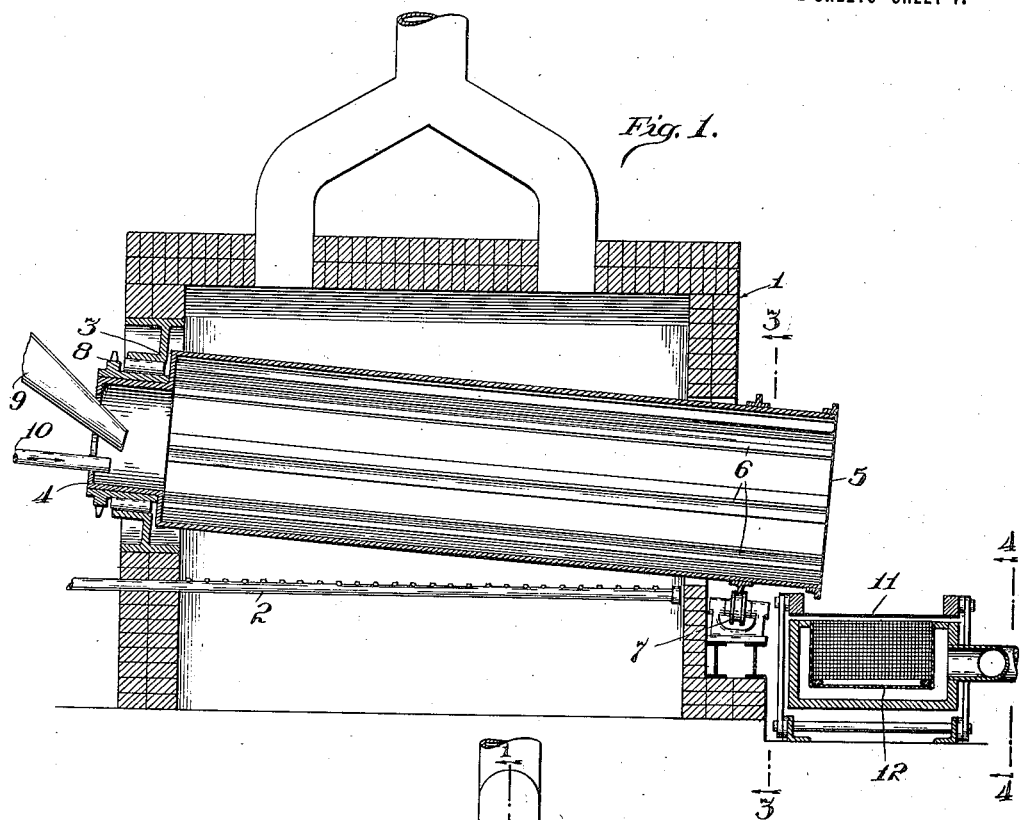
Figure 2:
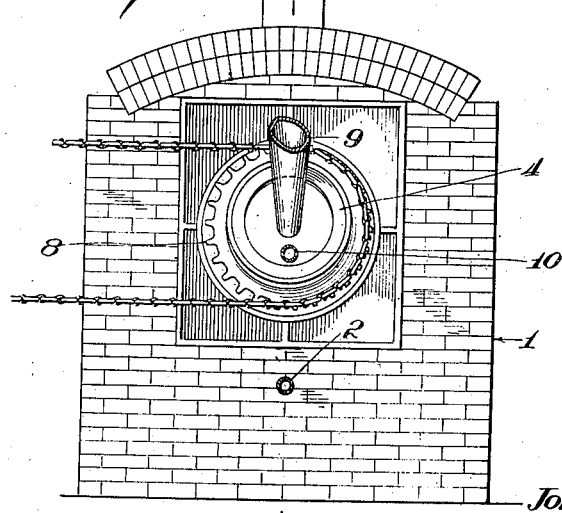
Figure 3:
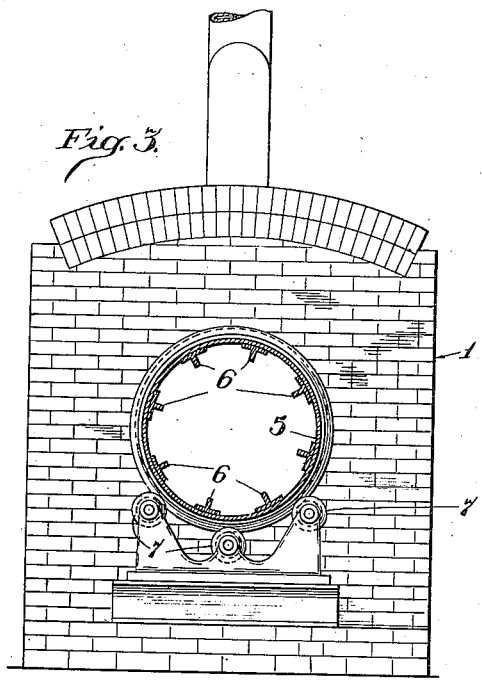
Figure 4:
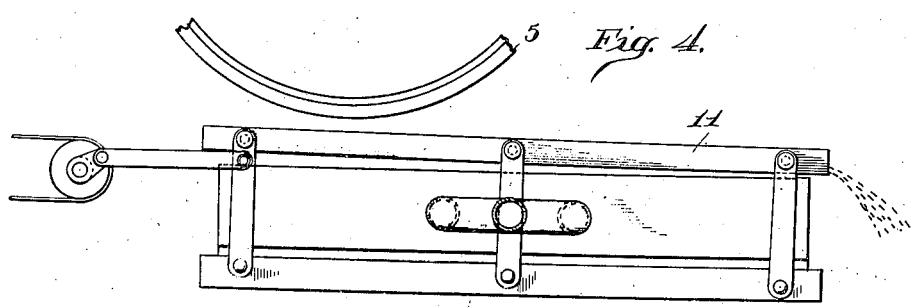

J. E. CAPS.
WATER SOFTENER AND METHOD OF PREPARING SAME.
APPLICATION FILED APR. 14, 1917. RENEWED JAN. 19, 1920.

1,356,756.

Patented Oct. 26, 1920.
2 SHEETS—SHEET 1.

Witnesses
Milton Lenoir

Inventor
John E. Caps.
By Rudolph M. Foy
Attorney

J. E. CAPS.
WATER SOFTENER AND METHOD OF PREPARING SAME.
APPLICATION FILED APR. 14, 1917. RENEWED JAN. 19, 1920.

1,356,756.

Patented Oct. 26, 1920.

2 SHEETS—SHEET 2.

Witnesses
Milton Lenova

Inventor
John E. Caps
By Rudolph
Attorney

UNITED STATES PATENT OFFICE.

JOHN E. CAPS, OF WILMETTE, ILLINOIS.

WATER-SOFTENER AND METHOD OF PREPARING SAME.

1,356,756.  Specification of Letters Patent.  Patented Oct. 26, 1920.

Application filed April 14, 1917, Serial No. 161,970. Renewed January 19, 1920. Serial No. 352,578.

*To all whom it may concern:*

Be it known that I, JOHN E. CAPS, citizen of the United States, residing at Wilmette, in the county of Cook and State of Illinois, have invented certain new and useful Improvements in Water-Softeners and Methods of Preparing Same; and I do hereby declare the following to be a full, clear, and exact description of the invention, such as will enable others skilled in the art to which it appertains to make and use the same.

This invention relates to water-softening reagents, and more particularly to natural zeolites, the object of the invention being to increase the efficiency of this material as a water-softening reagent by increasing the surfaces of the zeolite particles upon which the water to be softened and the regenerating liquid react.

The invention has reference more particularly and directly to the zeolite described and claimed in the application of George L. Borrowman, filed June 2, 1916, Ser. No. 101,248, and which consists of baked or burned green-sand or glauconite.

This material has been found to be very efficient as a water-softening reagent, but it was found that after treatment it changed its character and frequently after each regeneration would discolor the water filtered therethrough to a reddish brown. It was found that the material contains some free iron consisting of very fine particles adhering to the surfaces of the particles of vulcanite, and which become oxidized during use of the material and wash away gradually with the water.

This was found very objectionable and to cure this defect the material is treated according to the present invention to effect oxidization of these free iron particles and their removal simultaneously with the preparation of the raw material in accordance with the invention set forth in the application above identified.

According to the present invention, during the heating or baking of the material in accordance with the invention of George L. Borrowman the same is agitated and a current of air passed through the container therefor, and to which the particles of green sand being heated are exposed. The air coming in contact with the surfaces of the particles rapidly oxidizes the loose iron particles referred to, and after oxidization it is found that the same are easily removed. To effect such removal the material when heated is passed preferably over shaker screens which are vibrated or reciprocated, and cause the particles to rub against each other and against the surfaces upon which they are supported, and over which they are passed, and during this period a strong current of air is blown through the material which not only continues the oxidization of the particles, but also serves to blow the same free of the material. It has been found that after such treatment the baked vulcanite is of a uniform color, and is free of the objection above referred to, and delivers only clear soft water at all times.

The aforesaid method may be carried out in any apparatus suited to the purpose such for example as is shown in the accompanying drawings in which:

Figure —1— is a view in central longitudinal section of an apparatus adapted to the purpose taken on the line 1—1 of Fig. —2—.

Fig. —2— is a front elevation of the same.

Fig. —3— is a vertical transverse section of the same on the line 3—3 of Fig. —1—.

Fig. —4— is a fragmentary detail vertical transverse section of the same on the line 4—4 of Fig. —1—.

My said apparatus comprises an oven 1 of brick or other suitable material, equipped with heating means such as a perforated gas pipe 2 connected with a source of fuel. In one end wall of the oven 1 there is mounted a bearing 3 for the hollow trunnion 4 of a rotary drum 5, the latter being provided internally with a plurality of longitudinal ribs 6 preferably consisting of T-irons having their flanges riveted to the cylinder wall. The said drum is disposed at a slight incline, and is supported at its other end on idle rolls 7 suitably mounted in an opening in the other end wall of the oven 1.

On the trunnion 4 there is mounted a sprocket wheel 8 geared by means of a sprocket chain to a source of power in a well-known manner. Projecting into the said trunnion 4 is a spout 9 leading from a hopper containing the material to be treated, the latter being adapted to pass gradually through the said drum and be raised and dropped from the projecting webs or ribs 6 and to be heated to the desired degree during travel. Air is blown through the drum 5, being delivered from a pipe 10 connected with a source of supply of air under pressure, such as a fan blower. The material treated drops by gravity from the open delivery end of the drum 5 onto a vibrating screen 11 and passes gradually toward one end of the latter. Air is projected against the top surface of the screen 11, and serves to carry the fine particles of oxidized iron into a suitable receptacle 12 disposed below such screens, the projection of air being preferably effected by means of the fan connected with the receptacle 12 substantially in the manner employed in vacuum cleaning and similar dust-collecting apparatus.

It will be obvious, of course, that the aforesaid apparatus is merely exemplary, and that any other apparatus performing substantially the same functions will be suited to the purpose.

I claim as my invention:

1. The hereindescribed method of treating green sand or glauconite for removing free iron therefrom which consists in subjecting the same to the action of air simultaneously with heating it for effecting oxidization of the free iron, and subsequently dislodging and removing the oxidized iron particles from the surfaces of the glauconite particles.

2. The hereindescribed method of treating green sand or glauconite for removing free iron therefrom which consists in subjecting the same to the action of air and heat for effecting oxidization of the free iron and simultaneously agitating the same to cause the surfaces of the glauconite particles to grind upon each other to dislodge and remove the oxidized iron particles from said surfaces.

3. The hereindescribed method of treating green sand or glauconite for removing free iron therefrom which consists in subjecting the same to the action of air simultaneously with heating it for effecting oxidization of the free iron, and simultaneously agitating the same to cause the surfaces of the glauconite particles to grind upon each other to dislodge and remove the oxidized iron particles from said surfaces.

4. The hereindescribed method of treating water-softening zeolite which consists in agitating a mass thereof to cause the surfaces of the particles to grind each other to effect detachment and removal of surface particles of foreign matter, and subjecting said zeolite particles to the action of an air blast to separate the detached foreign particles therefrom.

5. The hereindescribed method of treating water-softening zeolite which consists in agitating a mass thereof to cause the surfaces of the particles to grind each other to effect detachment and removal of surface particles of foreign matter, and simultaneously subjecting said zeolite particles to the action of an air blast to separate the detached foreign particles therefrom.

6. A water-softening reagent consisting of baked glauconite having base exchanging surfaces substantially free from impurities.

7. A water-softening zeolite consisting of baked or burned glauconite having surfaces substantially free of solid particles of foreign matter.

8. The hereindescribed method of treating water-softening zeolite which consists in agitating a mass thereof to cause the surfaces of the particles to grind each other to effect detachment and removal of surface particles of foreign matter.

I testimony whereof I have signed my name in presence of two subscribing witnesses.

JOHN E. CAPS.

Witnesses:
M. M. BOYLE,
J. C. BRACKETT.